(12) United States Patent
Fry (10) Patent No.: US 9,431,012 B2
(45) Date of Patent: Aug. 30, 2016

(54) POST PROCESSING OF NATURAL LANGUAGE AUTOMATIC SPEECH RECOGNITION

(75) Inventor: Darrin Kenneth Fry, Kanata (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 818 days.

(21) Appl. No.: 13/460,462

(22) Filed: Apr. 30, 2012

(65) Prior Publication Data

US 2013/0289988 A1 Oct. 31, 2013

(51) Int. Cl.
*G10L 15/22* (2006.01)
*G10L 15/19* (2013.01)
*G10L 15/32* (2013.01)
*G10L 15/20* (2006.01)
*G10L 15/30* (2013.01)

(52) U.S. Cl.
CPC .............. *G10L 15/19* (2013.01); *G10L 15/32* (2013.01); *G10L 15/20* (2013.01); *G10L 15/30* (2013.01)

(58) Field of Classification Search
CPC ........ G10L 15/19; G10L 15/22; G10L 15/32
USPC .................................................. 704/270, 275
See application file for complete search history.

(56) References Cited

U.S. PATENT DOCUMENTS

| | | | |
|---|---|---|---|
| 5,754,978 A | 5/1998 | Pérez-Méndez et al. | |
| 6,434,523 B1* | 8/2002 | Monaco | 704/257 |
| 6,609,093 B1* | 8/2003 | Gopinath et al. | 704/236 |
| 6,757,652 B1 | 6/2004 | Lund et al. | |
| 6,879,956 B1* | 4/2005 | Honda et al. | 704/244 |
| 6,898,567 B2 | 5/2005 | Balasuriya | |
| 7,184,957 B2 | 2/2007 | Brookes et al. | |
| 7,340,395 B2 | 3/2008 | Gurram et al. | |
| 7,840,399 B2 | 11/2010 | Suontausta et al. | |
| 8,180,641 B2 | 5/2012 | Levit et al. | |
| 8,244,533 B2 | 8/2012 | Kiuchi et al. | |
| 8,370,159 B2 | 2/2013 | Lee et al. | |
| 2001/0041980 A1* | 11/2001 | Howard et al. | 704/270 |

(Continued)

FOREIGN PATENT DOCUMENTS

| | | |
|---|---|---|
| EP | 1796080 | 6/2007 |
| EP | 1 912 205 | 4/2008 |

(Continued)

OTHER PUBLICATIONS

Fiscus, "A Post-Processing System to Yield Reduced Word Error Rates: Recognizer Output Voting Error Reduction", IEEE Workshop on Automatic Speech Recognition and Understanding, 1997.*

(Continued)

*Primary Examiner* — Jialong He
(74) *Attorney, Agent, or Firm* — Brinks Gilson & Lione (57) ABSTRACT

A post-processing speech system includes a natural language-based speech recognition system that compares a spoken utterance to a natural language vocabulary that includes words used to generate a natural language speech recognition result. A master conversation module engine compares the natural language speech recognition result to domain specific words and phrases. A voting engine selects a word or a phrase from the domain specific words and phrases that is transmitted to an application control system. The application control system transmits one or more control signals that are used to control an internal or an external device or an internal or an external process.

20 Claims, 5 Drawing Sheets

(56) References Cited

U.S. PATENT DOCUMENTS

| | | |
|---|---|---|
| 2002/0046023 A1 | 4/2002 | Fujii et al. |
| 2002/0133346 A1* | 9/2002 | Kemble et al. ............... 704/257 |
| 2002/0194000 A1 | 12/2002 | Bennett et al. |
| 2003/0101054 A1* | 5/2003 | Davis et al. .................. 704/235 |
| 2003/0236664 A1 | 12/2003 | Sharma |
| 2004/0117179 A1 | 6/2004 | Balasuriya |
| 2004/0186714 A1* | 9/2004 | Baker ........................... 704/236 |
| 2004/0210437 A1 | 10/2004 | Baker |
| 2005/0038654 A1 | 2/2005 | Emonts et al. |
| 2005/0075881 A1* | 4/2005 | Rigazio et al. ............... 704/270 |
| 2005/0108010 A1* | 5/2005 | Frankel et al. ............... 704/235 |
| 2005/0288935 A1* | 12/2005 | Lee et al. ...................... 704/270 |
| 2006/0080105 A1 | 4/2006 | Lee et al. |
| 2006/0206331 A1 | 9/2006 | Hennecke et al. |
| 2007/0055525 A1 | 3/2007 | Kennewick et al. |
| 2007/0118364 A1* | 5/2007 | Wise et al. .................... 704/215 |
| 2008/0133220 A1 | 6/2008 | Paek et al. |
| 2009/0018833 A1* | 1/2009 | Kozat et al. .................. 704/257 |
| 2009/0150156 A1* | 6/2009 | Kennewick et al. ......... 704/257 |
| 2009/0204409 A1* | 8/2009 | Mozer et al. ................. 704/275 |
| 2009/0287486 A1 | 11/2009 | Chang |
| 2010/0082343 A1 | 4/2010 | Levit et al. |
| 2010/0114577 A1 | 5/2010 | Hayn et al. |
| 2010/0191530 A1* | 7/2010 | Nakano et al. ............... 704/244 |
| 2010/0217604 A1* | 8/2010 | Baldwin et al. .............. 704/275 |
| 2010/0312546 A1 | 12/2010 | Chang et al. |
| 2011/0022292 A1* | 1/2011 | Shen et al. .................... 701/200 |
| 2011/0029311 A1 | 2/2011 | Minamino et al. |
| 2012/0084086 A1 | 4/2012 | Gilbert et al. |
| 2012/0179464 A1 | 7/2012 | Newman et al. |

FOREIGN PATENT DOCUMENTS

| | | |
|---|---|---|
| EP | 2034472 | 3/2009 |
| WO | WO 2009/145796 | 12/2009 |

OTHER PUBLICATIONS

Extended European Search Report in EP application 13173119.2-1910, dated Aug. 12, 2013, pp. 1-5.

Extended European Search Report in EP application 13173059.0-1910, dated Aug. 12, 2013, pp. 1-6.

EP Extended Search report in EP Application 12166312.4-1901, dated May 31, 2013, pp. 1-10.

EP Extended Search report in EP Application 12166308.2-1901, dated Jul. 5, 2013, pp. 1-9.

Office Action issued in corresponding Canadian Application No. 2,814,300, dated Jan. 13, 2015, pp. 1-6.

European Examination Report issued in corresponding EP application 12166308.2-1901, issued Jan. 12, 2015, pp. 1-5.

Office Action issued in Canadian Patent Application No. 2,814,300, dated Nov. 24, 2015, pp. 1-5.

* cited by examiner

Figure 5 ately designate corresponding parts throughout the different views.

POST PROCESSING OF NATURAL LANGUAGE AUTOMATIC SPEECH RECOGNITION

RELATED APPLICATION

This disclosure relates to U.S. Ser. No. 13/460,443 titled "Multipass ASR Controlling Multiple Applications," filed the same day as this disclosure (Apr. 30, 2012), the contents of which are incorporated herein by reference.

BACKGROUND OF THE INVENTION

1. Technical Field

This disclosure also relates to voice recognition and more particularly to a secure automatic speech recognition technology.

2. Related Art

Automatic Speech Recognition (ASR) attempts to determine what words, phrases, or sentences are spoken. Some applications focus on constrained information and provide access to limited tasks such as finding a business address, a phone number, or support a request for directory assistance, for example. Some systems may recognize a small or limited vocabulary (1-20 words) of isolated words, spoken in a specific format that requires a very specific transmission system (e.g., a high quality close talking input) and requires continuous training. Such systems require substantial amounts of processing.

Despite the substantial resources devoted to ASR, some technology is subject to significant error rates and cannot prevent the interception of critical information. Few interactions or spoken utterances may be recognized at the sentence-level, with only slight improvements at the word level as application grammars may be shared across computing platforms. As the automatic speech recognizers are elevated to other applications, security and accuracy will be of utmost importance especially when needed to resolve urgent conditions that require immediate attention (e.g., an emergency call) or when used to prescribe medications or when used to register a level of acuity in a health care assessment.

SUMMARY

A post-processing speech system includes a natural language-based speech recognition system that compares a spoken utterance to a natural language vocabulary that includes words used to generate a natural language speech recognition result. A master conversation module engine compares the natural language speech recognition result to domain specific words and phrases. A voting engine selects a word or a phrase from the domain specific words and phrases that is transmitted to an application control system. The application control system transmits one or more control signals that are used to control an internal or an external device or an internal or an external process.

Other systems, methods, features, and advantages of the inventions will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The inventions can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

This detailed description describes post-processing and a post-processing system (referred to as a post processor or post-processing engine) that delivers a grammar-based ASR recognition result from a natural language-based ASR recognition result. The recognition result may comprise indicia, symbols, objects, or other agnostic representations that may control internal or external devices or processes. ASR agnostic control provides the benefit of spoken language recognition and spoken language control in any language, without requiring applications to recognize a spoken language or dialect. The ASR system includes a real-time post-processing that processes recognition results of selected ASRs though local domain expert processes or domain expert systems when normalization results are available. The recognition results of the post-processing may be selected from local or distributed ASR systems in real-time or after a specified delay without exposing the words associated with an application to an external computing platform. The post-processing system is accurate, secure, robust, and scalable to audio-only and multi-modal systems (e.g., systems that process other sources of information besides audio), and is less susceptible to noise, corruption, and the interception of protected grammars and vocabularies.

Some post-processing systems improve speech recognition through a parallel architecture by means of a tree-based structure that may support the recognition of a limited vocabulary size in one or more processing branches (or paths) and the ability to support an unlimited vocabulary size that can include a dictionary in one or more processing branches (or paths). The recognition results of some of the larger vocabulary ASRs and/or remote ASRs may be normalized with domain specific grammars in their respective processing branches. Selection may occur based on a likelihood calculation, confidence level, or confidence score (referred to as a confidence score) that may be preserved in ASR metadata. When the highest likelihood or confidence score exceeds a predetermined or contextual threshold, an alignment system may classify the spoken utterance as correctly recognized. The results and the ASR metadata may be transmitted to a local or remote system, device, or application.

Figure 1:
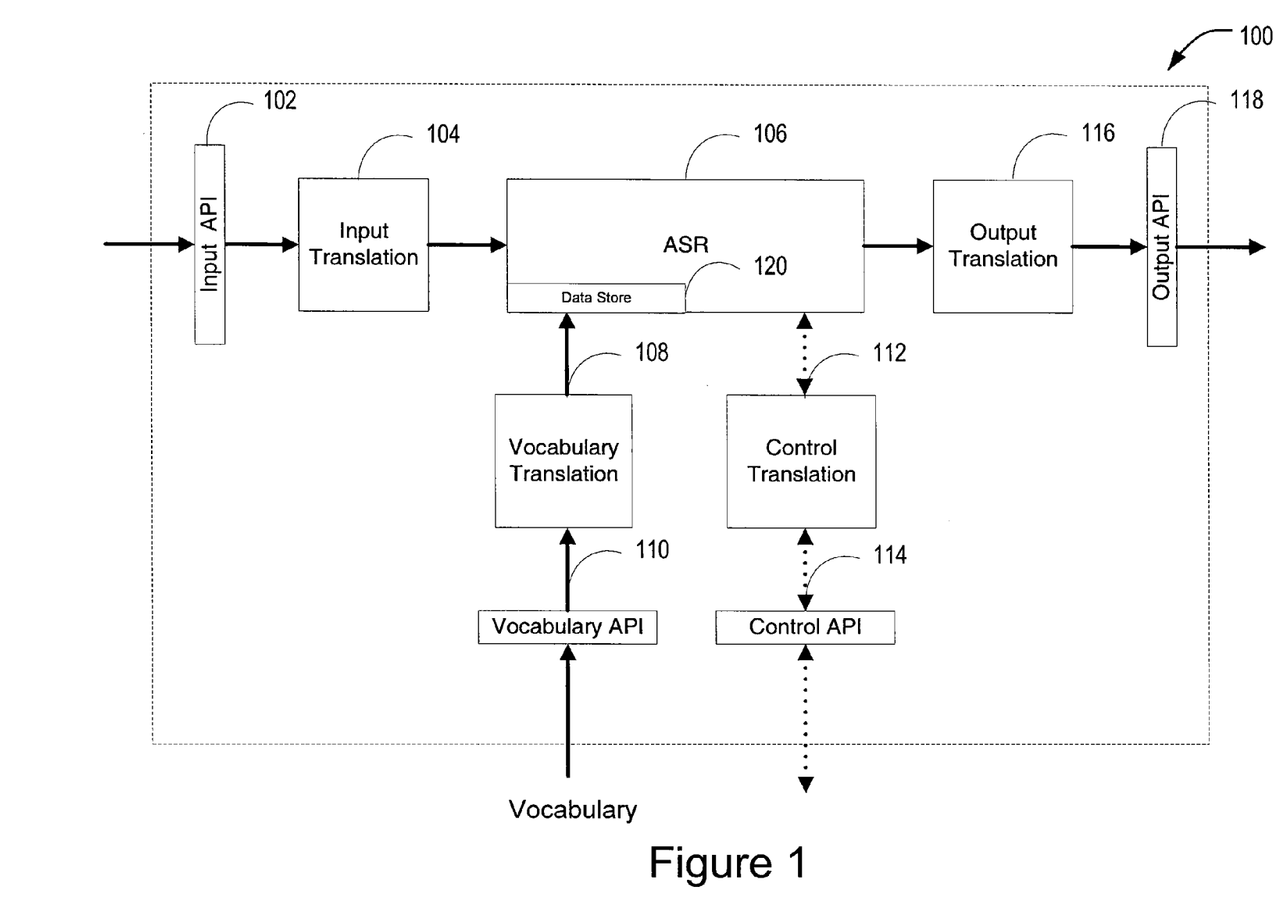
FIG. 1 is a block diagram of a grammar-based ASR translation architecture.

FIG. 1 shows a grammar-based ASR architecture 100 that may transmit an output translation through an output Application Program Interface (API) 118. A set of program routines that are part of an input API 102 are accessed by an ASR application program. In some systems input API 102 interfaces a device that converts speech into analog signals or into digital data when implemented in the digital domain. An input translator 104 or translation program may convert the input from a first frequency or frequency range to a second frequency or frequency range. For example, if the input signal occurs near 48 kHz, the input translator 104 or translation program may convert the 48 kHz speech input into about an 8 KHz speech input. A grammar-based ASR engine 106 captures the speech signal dynamics by processing frames of speech input in real-time or after a programmed delay. A real-time operation may comprise an operation matching a human's perception of time or a virtual process that is processed at the same rate (or perceived to be at the same rate) as a physical or an external process. An acoustic modeling, feature extraction, and normalization that match the sound parts of the input signal against the vocabularies that are retained in a data store 120. While shown as a unitary part of the local grammar-based ASR engine 106, the data store 120 may reside in a local or distributed memory, in a cloud, or a local or distributed database. The database structure may support a database sublanguage (e.g., structured query language, for example) that may be used for querying, updating, and managing data stored in a local or distributed memory of the databases. The database may be accessible through database engine or APIs between the database and grammar-based ASR engine 106 that handles requests for database actions and controls database security and data integrity requirements. A cloud or cloud based computing may refer to a scalable platform that provides a combination of services including computing, durable storage of both structured and unstructured data, network connectivity and other services. The metered services provided by a cloud or cloud based computing may be interacted with (provisioned, de-provisioned, or otherwise controlled) via one of the ASR's APIs.

The vocabulary API 110 in FIG. 1 may provide access to all of the data needed to recognize speech. In some systems it may include one or more language models, acoustic models, word dictionaries, speaker profiles, etc. that may be accessed by the grammar-based ASR engine 106 through a vocabulary translator 108. A control translator 112 and control API 114 may provide access to speaker specific data, such as a speaker's address book, for example and dynamic data that may be translated into active grammars. Word patterns and/or grammars may be used by the grammar-based ASR engine 106 to recognize the speech input. The grammars may be retained in a local or a remote file retained in the data store 120 that contains a list of words and phrases to be recognized and may also contain programming logic that aid the ASR engine 106 or an ASR application. A speech-to-text (STT) synthesis by the output translator 116 may translate the recognition output of the grammar-based ASR engine 106 into text that may interface a local or remote system or application through an output API 118.

Figure 2:
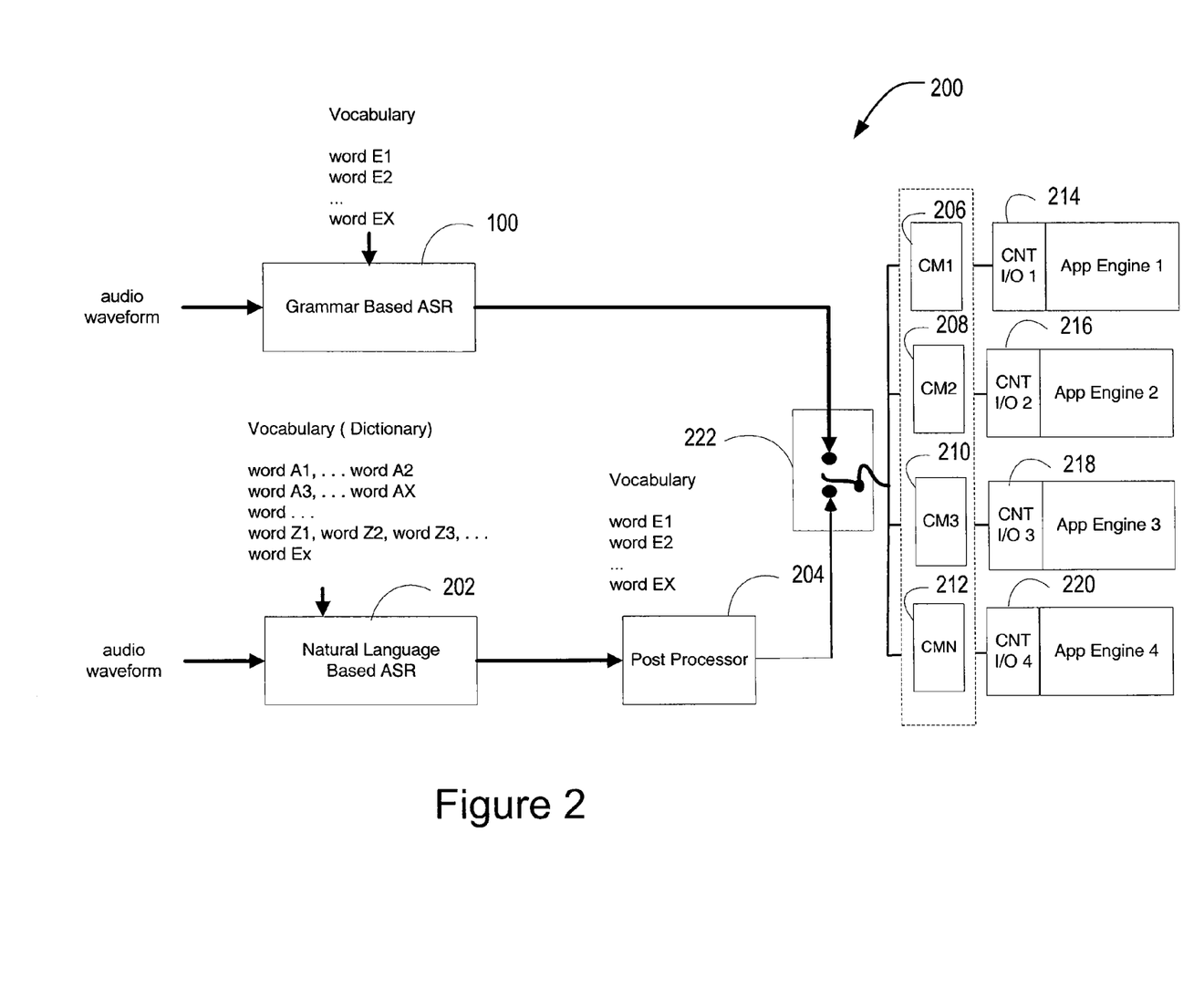
FIG. 2 is a block diagram of a data flow of an automatic speech recognition system.

In FIG. 2 the automatic speech recognition system 200 includes a grammar-based ASR 100 and a non-grammar-based ASR shown as a natural language-based ASR 202. Like the grammar-based ASR 100, the natural language-based ASR 202 includes an acoustic modeling, feature extraction, and normalization that match the sound parts of an input signal against a large natural language vocabulary that may be stored locally in a memory or database, or may be remote from the grammar-based ASR 100 in a cloud or in a cloud based computing system. Because natural language systems encourage users to speak naturally, the natural language-based ASR 202 may include a dictionary or a large set of data used by a natural language-based speech engine while executing speech recognition that may define the phonemes in the language or dialect. Some natural language-based ASR 202 includes multiple grammars that may be activated alone or in combination that are much larger than the grammars used by the grammar-based ASR 100. Because a vocabulary may comprise all of the words in the active grammars, the natural language-based vocabulary may be much larger than the grammar-based vocabulary.

In FIG. 2 the natural language-based ASR 202 and the grammar-based ASR 100 generate recognition results when the outputs of the natural language-based ASR 202 and grammar-based ASR 100 recognize speech. The automatic speech recognition system 200 processes the output of the natural language-based ASR 202 to improve the accuracy, robustness, and security of the ASR recognition results delivered by the automatic speech recognition system 200. While a post-processing process or a post-processing engine 204 is shown in the processing path of the natural language-based ASR 202 in FIG. 2, it may interface the grammar-based ASR 100 at or near an alignment engine 222 that may receive recognition results from the grammar-based ASR 100 and natural language-based ASR 202. The grammar-based ASR 100, natural language-based-ASR 202, post processor 204, and application engines 214-220 may operate on the same computing platforms in some systems; and may operate in a cloud or operate on cloud-based server or server cluster in other systems without exposing the words and sub-grammars associated with the application engines 214-220. The application engines 214-220 may comprise a program or a portion thereof executed by a processor that is designed to assist in the performance or the execution of a specific task such as controlling an internal or external device or process. In FIG. 2, the application engines 214-220 are responsive to application control systems that are represented as the Conversation Modules (CM 1, CM 2, . . . CM N 206-212).

The speech engines that recognize speech in the grammar-based ASR 100 and natural language-based-ASR 202 may compare spoken utterances to spoken vocabularies in any language (e.g., English, or Chinese, German, Spanish, etc.) or variations of languages. The matches from these comparisons may comprise ASR indicia, symbols, objects, representations, etc. and ASR metadata that may identify a confidence score and the type of ASR system or process that generated the recognition results. The ASR indicia, symbols, objects, representations, etc. are language agnostic. ASR agnostic control provides the benefit of spoken language recognition and a spoken language control in any spoken language, without requiring the application engines 214-220 to recognize a spoken language or dialect or its textual translation. Instead, some application engines 214-220 and some of all the systems described herein are responsive to indicia, symbols, etc., that when issued by the natural language-based ASR 202 or grammar-based ASR 100, cause an action to occur. Thus, an English, Chinese, German, Spanish, etc. user that speaks naturally to the ASR systems, such as requesting a music system to pause the playback of a song, can cause a post-processed natural language-based ASR 202 and/or grammar-based ASR 100 to issue a task specific indicia, symbol, or object that causes an application to temporarily pause the playback of a song.

The automatic speech recognition system 200 of FIG. 2 employs a parallel ASR architecture. A first path processes spoken utterances through a grammar-based ASR 100 in real-time. Through a grammar-based ASR recognizer, local or distributed libraries, speaker-dependent grammars (e.g., about 20-100 words/phrases), and/or a speaker's address book, the decoder or speech engine may output text and ASR metadata, where each spoken word or phrase is classified as recognized. The ASR metadata may preserve the word-level or phrase timing (e.g., time to the post) of a word or phrase, and/or the confidence score. A natural language-based ASR 202 processes the same spoken utterance synchronously with the operation of the grammar-based ASR 100 in realtime. Using a natural language-based ASR recognizer, local or distributed libraries, speaker-independent grammars (e.g., greater than about 100 words/phrases that may include dictionaries), the natural language decoder (or natural language speech engine) may generate and pass the natural language recognition results and natural language ASR metadata to the post-processing engine 204. When the recognition results (e.g., the normalizations) are represented by language agnostic indicia, such as the exemplary alphanumeric identifiers shown in FIG. 2, the recognition results and ASR metadata may comprise indicia that may be further processed in that same form or format.

Figure 4:
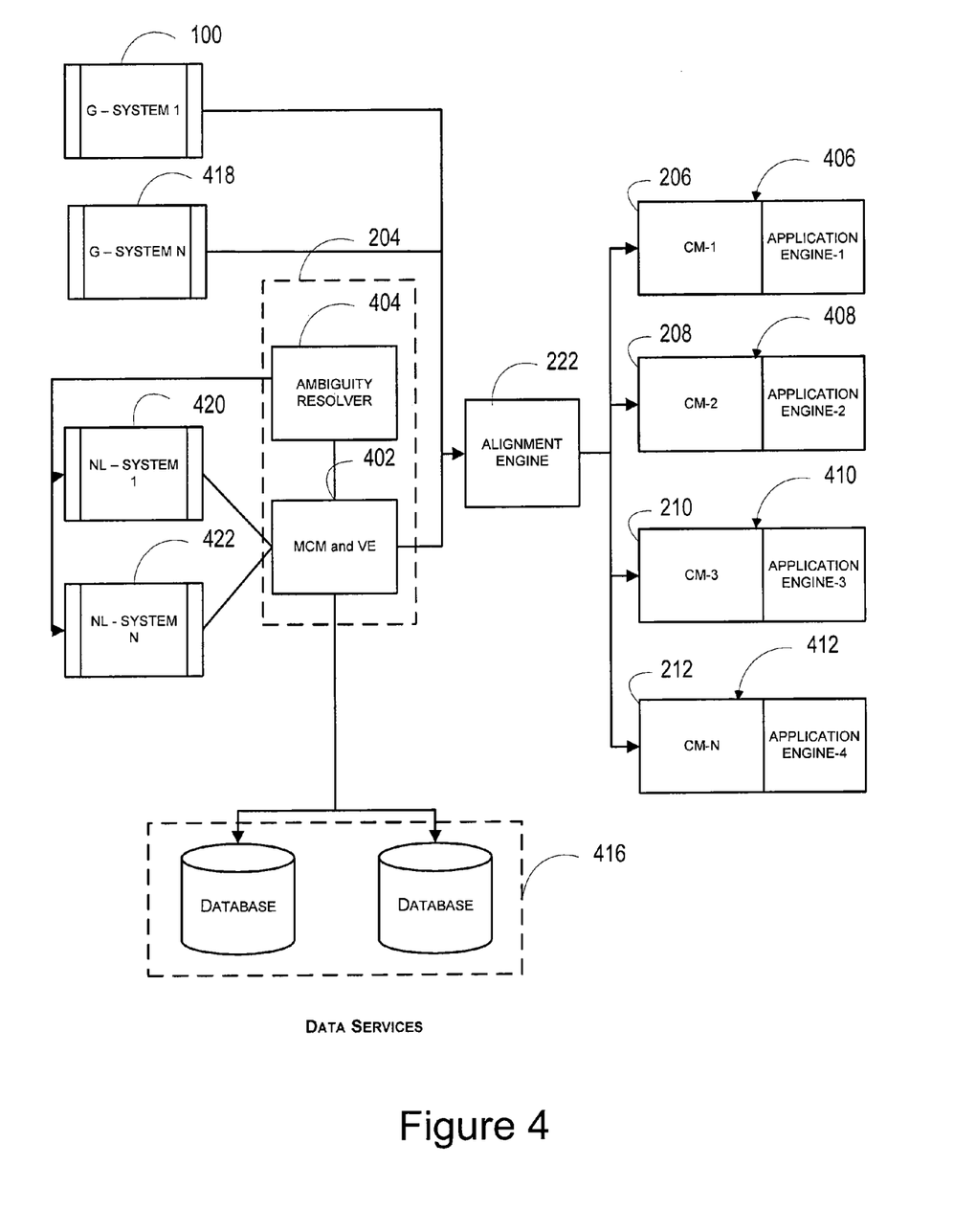
FIG. 4 is a block diagram of an alternative post-processing system.

In FIGS. 2 and 4, the post-processing engine 204 comprises a portion of a back-end processor in the automatic speech recognition system 200. It includes or interfaces a Master Conversation Module (MCM) engine 402, and in some systems, an optional ambiguity resolver engine 404. When recognition results are rendered by the natural language-based ASRs 420 and 422 in FIG. 4, the natural language-based ASRs 420 and 422 pass control to the MCM 402, along with access to the natural language recognition results, natural language ASR metadata, and a local, distributed, and/or cloud based data store 416. In some systems, the natural language-based ASRs 420 and 422 and/or the post-processing engine 204 may be part of or reside on a distributed or a cloud based computing platform.

Once the spoken utterance (or audio) is processed by the natural language-based ASRs 420 and 422, the normalized results (e.g., the natural language recognition results and natural language ASR metadata) are further processed by domain expert systems. The MCM engine 402 compares the normalized results to a vocabulary of selected words and sub-grammars that are associated with and mapped to one or more application specific words or phrases or CM words or phrases (e.g., domain expert words and/or phrases in an active grammar or lists of words and phrases that assist in the performance or the execution of a specific task). The vocabulary may include one or more language models, acoustic models, word dictionaries, speaker profiles, speaker dependent grammars, speaker's address book, local or distributed libraries and/or etc. and in some systems may include all of the words, phrases, and programming logic found in the vocabulary of the grammar-based ASR 100. The vocabularies and sub-grammars may be stored locally in a database or a remote from the MCM engine 402 in a cloud or in a cloud based computing system. In some systems, comparison made by the MCM engine 402 occurs through a homonym match.

A voting engine (VE) within or interfaced to the MCM engine 402 may score the comparisons and select the best matching word or word sequence. If the voting score does not exceed a predetermined threshold, if two or more scores are not differentiable, or another conflict cannot be resolved, the MCM engine 402 may invoke an ambiguity resolver engine 404 that may prompt the MCM 402 to automatically re-execute. In some systems, the ambiguity resolver engine 404 may request the MCM 402 to reprocess the natural language-based recognition results against an alternate word lists or alternate sub-grammars. If the conflict is not resolved after re-execution and the confidence score of the natural language-based recognition results exceeds a predetermined threshold, the post-processing system 200 may pass the natural language recognition results to the alignment engine 222. If the conflict persists, the ambiguity resolver engine 404 may abort the natural language speech recognition by not passing natural language recognition results to the alignment engine 222 or the ambiguity resolver 404 may report the conflict to the user by reporting a detection of words that are not in the post-processing system's 200 vocabulary or by prompting the user to repeat the spoken utterance and then initiate a reprocessing.

If the MCM engine 402 can recognize the natural language-based recognition results, for example by selecting the normalization with the highest score, the MCM engine 402 passes control to an alignment engine 222. The alignment engine 222 evaluates each branching point using a voting scheme, which selects between the grammar-based and the post-processed natural language-based recognition results that are to be passed to the application control systems shown as the CM engines 406-412 that are remote from the application engines 214-220 in FIG. 2, but are integrated with or a unitary part of the application engines 406-412 in FIG. 4. Voting may occur through any method and based on any metric including 1) the speed and confidence (e.g., above a predetermined confidence score) of the results; 2) frequency of occurrence and average word confidence (e.g., above a predetermined confidence score); 3) highest confidence score; etc. Voting by speed and confidence may select a recognition result that exceeds a predetermined threshold based on the order the alignment engine 222 receives recognition results. A first in, first out method may be used to select the first recognition results that exceed a confidence score. The second voting method may select a result based on the frequency a recognition result occurs and an average confidence score for each of the recognition results. Ties may be broken arbitrarily or by a secondary scheme. The third voting method may select a result based on the highest confidence score between the grammar-based and the post-processed natural language-based recognition results.

When the alignment engine 222 selects a recognition result, the alignment engine 222 passes control to application control systems (CM) shown as part of the application engines 406-412 in FIG. 4 (e.g., four are shown, but more or less are used in other systems) and remote from the application engines 214-220 shown in FIG. 2. In FIG. 2 the distributed CMs 206-212 interface a control signal input/output shown as I/O 1-I/O 4 in FIG. 2. The CMs 206-212 provide application specific control signals (e.g., electronic signals) that may control internal or external devices and processes that are executed or assisted in the execution by the application engines 214-220 in FIG. 2 and application engines 406-412 in FIG. 4. In an automotive application, for example, the CM engines 206-212 may issue control signals that control entertainment or multimedia applications, communication applications (e.g., email, text messaging such as Short Message Services or SMS, etc.), phone applications, comfort applications, a navigation application, a powertrain application (e.g., an application that manages engine functions), a body control application (e.g., a control unit responsible for monitoring and controlling various electronic accessories in a vehicle chassis, controls the power windows, power mirrors, immobilizer system, central locking, etc.).

Figure 3:
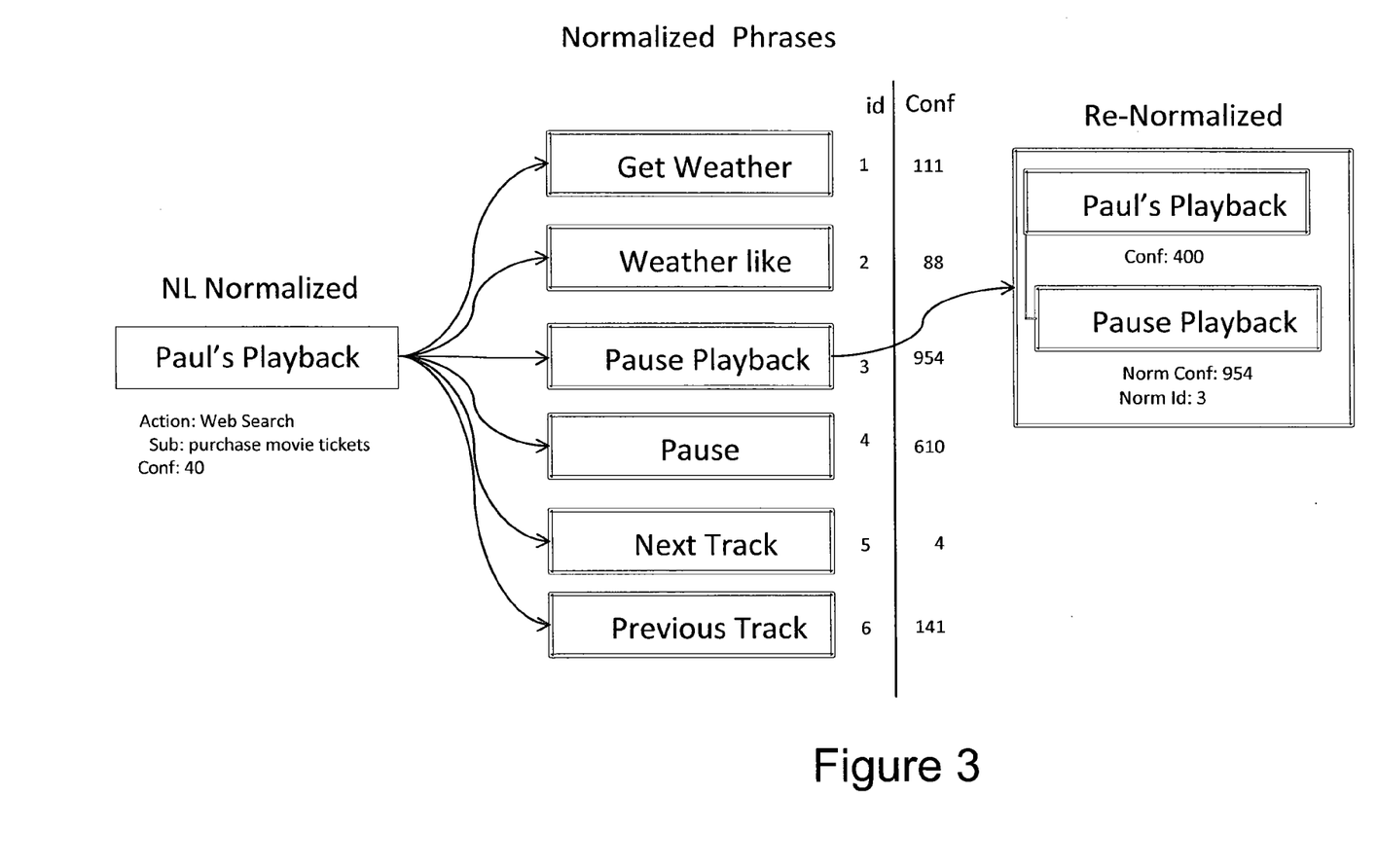
FIG. 3 is a visual representation of post-processed automated speech recognition.

A visual representation of post-processed automated speech recognition is shown in FIG. 3. In this example, an utterance of "pause playback" was identified by a natural language-based ASR as "Paul's Playback." The speech utterance was not likely found in the natural language vocabulary, because FIG. 3 shows that a Web-search rendered the primary recognition result at a confidence score of 40. By a comparison to lists of words and phrases that are mapped to one or more CM engines, the MCM engine matched the natural language recognition result to two phrases "Paul's Playback" and "Pause Playback." A voting engine indicates a confidence score of 400 and 954, respectively.

Figure 5:
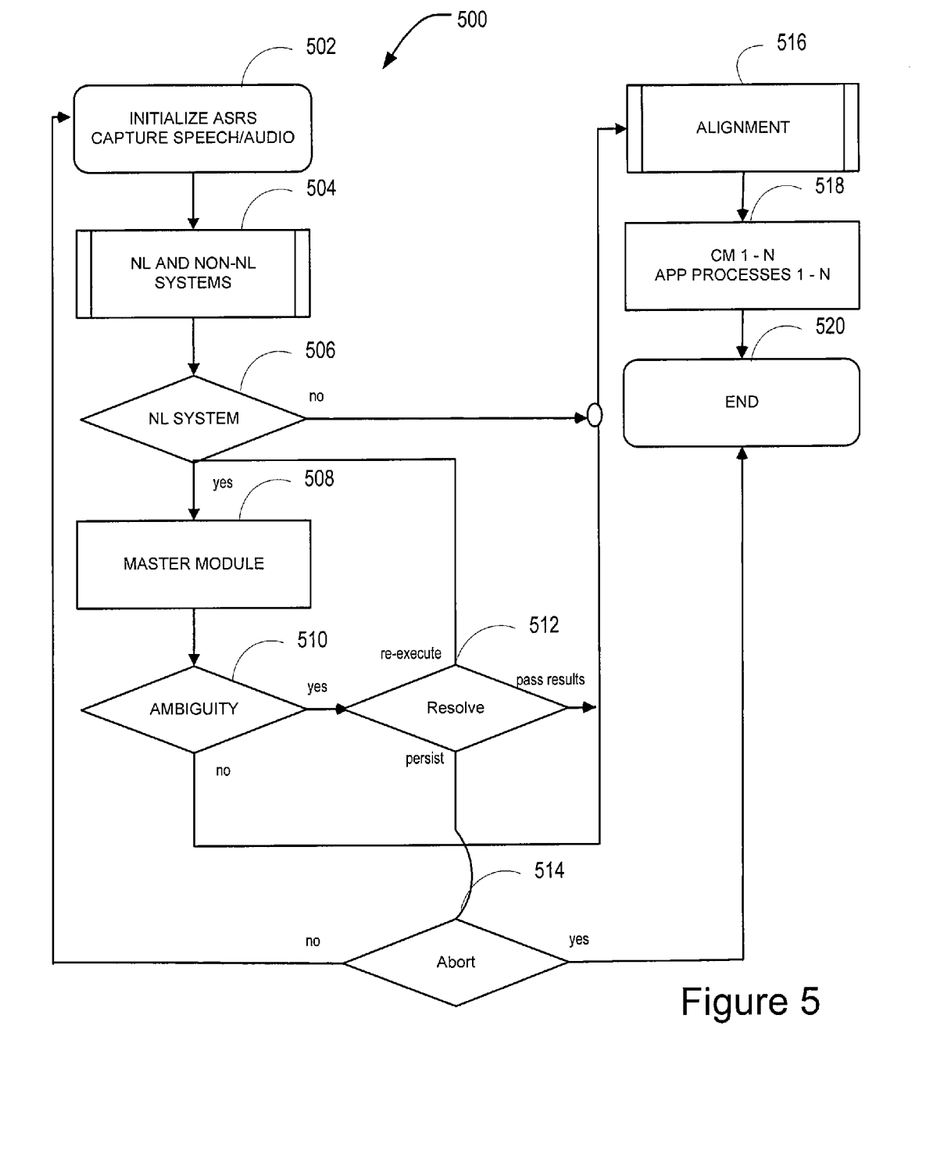
FIG. 5 is a flow diagram showing post-processing.

FIG. 5 is a graphical overview of a post-processing 500. When the ASRs are on-line and reach a running state, speech is captured, translated into analog/digital data or frames of data at 502 and a grammar-based speech engine compares the spoken utterances to a vocabulary (e.g., speaker dependent, task specific, etc.) or grammar and passes its recognition results and confidence score to an alignment process at 516. The recognition results may comprise ASR agnostic indicia, symbols, objects, representations, etc. that may be further processed in that same form or format.

A natural language-based speech engine also compares the same spoken utterances to some or all of the natural language vocabulary synchronously with the operation of the grammar-based speech engine at 504. A natural language vocabulary includes all of the words in the natural language active grammars and may be larger than the vocabulary associated with the grammar-based speech engine. The natural language recognition results identified at 506 may include a natural language confidence score and may be language agnostic that is further processed in that same form or format. At 508 the natural language recognition results are compared against a post-processing grammar containing lists of words and phrases that are associated with and mapped to application specific domains and may comprise a specialized vocabulary for executing or assisting in the execution of a task or control an internal or external device or process. The comparison may generate confidence scores that reflect the likelihood that each of the words and phrases that make up the post-processing grammar match the natural language recognition results. In some processes (as well as some of the systems described above), the post processing-grammar/vocabulary may be indistinguishable from the grammar/vocabulary used by the grammar-based speech engine. Moreover, in some post processing 500 the grammar/vocabulary may never be processed by the natural language-based speech engine (or natural language-based recognition system) or exposed to a process outside of the local processing platform that executes the post processing 500.

If the post-processing confidences do not exceed a predetermined threshold, if two or more confidences are not differentiable by more than a predetermined confidence level, or other conflicts cannot be resolved at 510, the natural language speech recognition results may be reprocessed at 508. In some processes the repossessing of the natural language recognition results may process the natural language recognition results against an alternate word lists, phrases and/or alternate post-processing grammar that are requested by a resolving process 512. The alternate word lists, phrases and/or alternate post-processing grammar are also mapped to application specific domains. If the conflict is not resolved after reprocessing at 508 and the highest confidence exceeds a predetermined threshold, the post-processing 500 may pass the natural language recognition results to the alignment process at 516. If the failure persists, the resolving process may abort the post-processing by not passing recognition results to the alignment process at 516 or the post-processing 500 may report the conflict to the user by reporting a detection of words that are not in the post-processing vocabulary or by prompting the user to repeat the utterance before reinitiating the process at 514 and 502.

If no ambiguity or conflicts are found at 510, the post-processing process 500 passes control to an alignment process 516. The alignment process 516 evaluates each processing thread using a voting scheme, which selects between the grammar-based and natural language-based recognition results that are to be passed to the application control processes. Voting may occur through any process and may be based on any metric including 1) the speed and confidence (e.g., above a predetermined confidence score) of the results; 2) frequency of occurrence and average word confidence (e.g., above a predetermined confidence score); 3) highest confidence score; etc. Voting by speed and confidence may select a recognition result that exceeds a predetermined threshold based on the order the alignment process 516 receives recognition results. A first in, first out process may be used to select the first recognition results that exceed a confidence score. The second voting process may select a result based on the frequency a recognition result occurs and an average confidence score for each of the recognition results. Ties may be broken arbitrarily or by a secondary process. The third voting process may select a result based on the highest confidence score between the grammar-based and natural language based recognition results.

When the alignment process 516 selects a recognition result, the alignment process passes 516 control to application control processes (e.g., CM 1, 2, 3, . . . N) shown as part one or more application processes (e.g., APP PROCESSES 1, 2, 3, . . . N) at 518. The CMs generate and transmit application specific control instructions in some processes and control signals (e.g., an electronic signal) that cause an action such as an application processes controlling internal or external devices and other processes before the post processing ends at 520.

While each of the systems, engines, methods, and descriptions described may stand alone they also may be encompassed within other systems and applications. Other alternate systems may include any combinations of structure and functions described above or shown in one or more or each of the figures. These systems or methods are formed from any combination of structure and function described. The structures and functions may process additional or different input. For example, alternate post-processing normalization engines may process the same frames of spoken utterances that the natural language-based ASR previously processed. Another alternate system may comprise a natural language-based ASR (e.g., ASR 202 in FIG. 2) in communication with a post-processing engine (e.g., post-processing engine 204), which communicates with one or more conversation modules (e.g., CM 206-212) that may be remote from or may be a unitary part of their respective application engines (e.g., 214-220). By processing the normalized recognition results of the natural language-based ASR through a post-processing system, the post-processing system can avoid delivering "out of domain" results. Should the natural language-based ASR deliver an "out of domain result" a post-processing engine may re-process the normalized results bringing it back to the desired domain. One of the benefits of this technology is that it greatly improves usability of natural language-based systems with CMs or application engines that may have a limited capability and/or may be limited by the commands set that the CMs may process or can act upon.

The system, engines, methods, and descriptions described may also be programmed in one or more controllers, devices, signal processors, and one or more processors and a coprocessor (e.g., a coprocessor is a processor distinct from a main processor, that performs additional functions to assist the main processor). The processors may be arranged in a parallel processing structure and/or multiprocessing structure. Parallel processing may run on a computer containing two or more processors running simultaneously. Parallel processing differs from multiprocessing in the way a task may be distributed. In multiprocessing, one processor may manage the conversion of spoken frames into analog data, another may manage the grammar-based ASR engines, and a third may manage the natural language-based ASR engines. Alternatively, each of the engines (e.g., grammar-based ASR engines, natural language-based ASR engines, etc.) described herein may run on virtual machines in which one, two, etc. or all of the engines are isolated on a complete system platform that supports the execution of a complete operating system (OS). The virtual machines may be limited to the resource and abstractions provided by the particular virtual machine. Some virtual machines may not break out of its isolated virtual world to access more resources. In yet another alternative, the natural language-based ASR, the grammar-based ASR, the master conversation module engine, ambiguity resolver engine, alignment engine, conversation module engine, and application engines may be executed by a multitasking processor executing multiple computer threads (e.g., multithreading).

The engines may comprise a processor or a portion of a program that executes or supports an ASR system or process. The processor may comprise one, two, or more central processing units that execute the instruction code, mine speech data, and access data from memory that generate, support, and/or complete an operation, compression, or signal modifications. The ASR applications may support and define the functions of a processor that is customized by instruction code (and in some applications may be resident to any ASR enabled systems that may include vehicles, communication systems, medical systems, audio systems, telephones, teleconferencing systems, etc.). In some systems, a front-end processor may perform the complementary tasks of capturing audio or speech for a processor or program to work with, and for making the audio files and processing results available to back-end ASR processors, post processors, controllers, or devices.

In some applications, the systems, methods, engines, and descriptions may be encoded in a non-transitory signal bearing storage medium, a computer-readable medium, or may comprise logic stored in a memory that may be accessible through an interface and is executable by one or more processors. Some signal-bearing storage medium or computer-readable medium comprise a memory that is unitary or separate (e.g., local or remote) from ASR enabled devices such as such as cell phones, wireless phones, personal digital assistants, two-way pagers, smartphones, portable computers, vehicle based devices, medical diagnostic systems, medical record systems, and any other devices that interface or include ASR technology. If the descriptions or methods are performed by software, the software or logic may reside in a memory resident to or interfaced to the one or more processors, devices, or controllers that may support a tangible or visual communication interface (e.g., to a display), wireless communication interface, or a wireless system.

The memory may retain an ordered listing of executable instructions for implementing logical functions. A logical function may be implemented through digital circuitry, through source code, or through analog circuitry. A "computer-readable storage medium," "machine-readable medium," "propagated-signal" medium, and/or "signal-bearing medium" may comprise a non-transitory medium that stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a memory or database accessible by a database engine that provides access to a database management system. When such devices are responsive to such commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action "(i.e., the device's response) to . . . . " merely follow another action.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

I claim:

1. A post-processing automated speech recognition system comprising:
a natural language-based speech recognition system that compares a spoken utterance to a natural language vocabulary comprising words in one or more active grammars to generate a natural language speech recognition result and a natural language confidence score;
a master conversation module engine that post processes the natural language speech recognition result by comparing the natural language speech recognition result generated by the natural language-based speech processing system to lists of words and phrases from a plurality of active sub-grammars that are mapped to a plurality of domain specific words and phrases, and generates a post processed natural language speech recognition result confidence score for each of the listed words and phrases from the plurality of active sub-grammars based on a likelihood that the respective listed words and phrases from the plurality of active sub-grammars match the natural language speech recognition result;
a voting module engine that is interfaced to the master conversation module engine and that is operable to select a word or a phrase from the list of words and phrases from the plurality of active sub-grammars, based on the post processed natural language speech recognition result confidence scores; wherein:
when the voting module engine selects a word or phrase from the plurality of active sub-grammars based on the post processed natural language speech recognition result confidence scores, the selected word or phrase is transmitted to an application control system that transmits control signals used to control an internal or an external device or an internal or an external process; or when both of:
the voting module does not select a word or phrase from the plurality of active sub-grammars based on the post processed natural language speech recognition result confidence scores, and
the natural language confidence score exceeds a specified threshold,
then the master conversation module engine selects the natural language speech recognition result to be transmitted to the application control system;
where the natural language-based speech recognition system, the master conversation module engine, and the voting module engine are executed by one or more processors.

2. The post-processing automated speech recognition system of claim 1 where the natural language speech recognition result and the word or the phrase from the plurality of active sub-grammars selected by the voting module engine are represented by language agnostic indicia, objects or symbols that control one or more devices or processes.

3. The post-processing automated speech recognition system of claim 1 where a portion of the natural language-based speech recognition system is remote from the master conversation module engine and the plurality of active sub-grammars are remote from a portion of the natural language-based speech processing system.

4. The post-processing automated speech recognition system of claim 1 further comprising an ambiguity resolver module engine that resolves an ambiguity arising from the comparisons between the natural language speech recognition result generated by the natural language-based speech recognition system and the list of words and phrases from the plurality of active sub-grammars.

5. The post-processing automated speech recognition system of claim 1 further comprising a grammar-based speech recognition system that compares the spoken utterance to a grammar-based vocabulary comprising the active sub-grammars that are mapped to the plurality of domain specific words and phrases.

6. The post-processing automated speech recognition system of claim 5 further comprising an alignment engine that selects between the word or the phrase selected by the voting module engine and recognition results generated by the grammar-based speech recognition system, where the alignment engine transmits the selection to one of a plurality of application control systems.

7. The post-processing automated speech recognition system of claim 6 where the voting module engine comprises a portion of the master conversation module engine and the word or the phrase selected by the voting engine comprises the recognition result of the master conversation module engine, and where the alignment engine selects between the recognition results of the master conversation module engine and the recognition result generated by the grammar-based speech recognition system based on the natural language confidence score and a grammar-based confidence score.

8. The post-processing automated speech recognition system of claim 7 where the alignment engine selects between the recognition results of the master conversation module engine and the recognition result generated by the grammar-based speech recognition system based on an order the recognition results are received at the alignment engine.

9. The post-processing automated speech recognition system of claim 6 further comprising an application engine that controls an internal or external device or process in response to the alignment engine's transmission of a selection result.

10. The post-processing automated speech recognition system of claim 1 further comprising a grammar-based speech processing system that generates a grammar-based speech recognition result and grammar-based confidence score synchronously with the natural language-based speech recognition system.

11. The post-processing automated speech recognition system of claim 10 where the grammar-based speech processing system and the natural language-based speech processing system process the same spoken utterance.

12. The post-processing automated speech recognition system of claim 10 where the grammar-based speech processing system and the natural language-based speech recognition system are executed by a plurality of processors that run simultaneously.

13. The post-processing automated speech recognition system of claim 10 where the grammar-based speech processing system and the natural language-based speech recognition system, and the voting module engine are executed by a plurality of parallel processors.

14. The post-processing automated speech recognition system of claim 10 where the grammar-based speech processing system and the natural language-based speech recognition system, and the voting module engine each comprise a computing thread executed by a multitasking processor.

15. The post-processing automated speech recognition system of claim 1 further comprising a grammar-based speech recognition system that generates grammar-based speech recognition results synchronously with a plurality of natural language-based speech recognition systems interfaced to the master conversation module engine.

16. A computer implemented method of automatically recognizing speech comprising:
capturing speech utterances and converting the speech utterances into frames of speech;
recognizing speech utterances by comparing the frames of speech to a list of words in active grammars;
generating a natural language-based speech recognition result and a natural language confidence score;
post processing the natural language-based speech recognition result by comparing the natural language-based speech recognition result to a domain specific vocabulary that comprises lists of words and phrases from sub-grammars that are mapped to domain specific words or phrases and generating a post process confidence score for each of the words and phrases from the sub-grammars, based on a likelihood that the words and phrases match the natural language-based recognition result; and
selecting a speech recognition result based on a voting scheme; wherein:
a word or phrase from the sub-grammars that best matches the natural language speech recognition result based on the post process confidence scores, is selected as the speech recognition result; or
the natural language speech recognition result is selected as the speech recognition result when both of:

a word or phrase from the sub-grammars is not selected as the speech recognition result based on the post process confidence scores, and the natural language confidence score exceeds a specified threshold.

17. The computer implemented method of claim 16 further comprising generating multiple confidence scores that reflect a likelihood that each of a plurality of words and a plurality of phrases that comprise the sub-grammars match the speech recognition result.

18. The computer implemented method of claim 17 where the natural language-based speech recognition result and sub-grammars comprise indicia representing a plurality of words and a plurality of phrases.

19. A method of automatically recognizing speech comprising:

capturing a speech utterance;

recognizing the speech utterance by comparing the speech utterance to a list of words in active grammars by a natural language-based speech recognition system;

generating automated speech recognition results and a confidence score from the natural language-based speech recognition system;

post processing the natural language-based speech recognition results by comparing the natural language speech recognition results to a domain specific vocabulary that comprises lists of words and phrases from sub-grammars mapped to one or more application control signals that control an internal or external device or process through an application engine; and selecting a speech recognition post processing result based on a voting scheme, wherein:

a word or phrase from the sub-grammars that best matches the natural language speech recognition result based on the post processing comparisons is selected as the speech recognition post processing result; or the natural language speech recognition result is selected as the speech recognition post processing result when both of:

a word or phrase from the sub-grammars is not selected as the speech recognition post processing result based on the post processing comparisons, and the confidence score from the natural language-based speech recognition system exceeds a specified threshold.

20. The method of claim 19 further comprising executing a second selection by selecting between the speech recognition post processing result and a grammar-based speech recognition result that is generated by a grammar-based speech recognition system that processes the same speech utterance used to generate the automated speech recognition results from the natural language-based speech recognition system.

* * * * *